United States Patent [19]
Thomson

[11] Patent Number: 5,724,532
[45] Date of Patent: Mar. 3, 1998

[54] METHOD AND APPARATUS FOR EXCHANGING INFORMATION BETWEEN APPLICATION PROGRAMS ACCORDING TO A DRAG AND DROP OPERATION

[75] Inventor: Allan Thomson, Cupertino, Calif.

[73] Assignee: Bay Networks, Inc., Santa Clara, Calif.

[21] Appl. No.: 791,007

[22] Filed: Jan. 27, 1997

Related U.S. Application Data

[63] Continuation of Ser. No. 331,028, Oct. 27, 1994, abandoned.

[51] Int. Cl.⁶ ............................................. G06F 3/00
[52] U.S. Cl. ............................................. 395/346; 395/680
[58] Field of Search ............................ 395/346, 326, 395/335, 340, 339, 670, 680, 682, 683

[56] References Cited

U.S. PATENT DOCUMENTS

| | | | |
|---|---|---|---|
| 5,079,695 | 1/1992 | Dysart et al. | 395/680 |
| 5,157,763 | 10/1992 | Peters et al. | 395/340 |
| 5,289,574 | 2/1994 | Sawyer | 395/332 |
| 5,301,268 | 4/1994 | Takeda | 395/680 |
| 5,392,400 | 2/1995 | Berkowitz et al. | 395/200.01 |
| 5,408,602 | 4/1995 | Glokas et al. | 395/329 |
| 5,446,902 | 8/1995 | Islam | 395/703 |
| 5,483,654 | 1/1996 | Staron et al. | 395/353 |
| 5,530,865 | 6/1996 | Owens et al. | 395/680 |

OTHER PUBLICATIONS

Scheifler et al., "The X Window System," ACM Transactions on Graphics, vol. 5, No. 2, Apr. 1986, pp. 79–109.

McGregor, "Designing User Interface Tools for the X Window System", COMPCON Spring '89 IEEE Computer Society Int'l Conference, pp. 243–246.

McGregor, "Easy Windows", Digital Equipment Corporation, Oct. 1989, pp. 1–5.

"X Vision: The X Connection for Microsoft Windows," Vision Ware, Dec. 1989, pp. 1–2.

Dettmer, "X Windows: The Great Integrator," IEE Review, Jun. 1990, pp. 219–222.

Petzold, "Windows 3.1—Hello to TrueType, OLE, and Easier DDE; Farewell to Real Mode," Microsoft Systems Journal, Sep. 1991, pp. 17–26.

Richter, "Drop Everything: How to Make Your Application Accept and Source Drag–and–Drop Files," Microsoft Systems Journal, May–Jun. 1992, pp. 19–30.

Richter, "Windows 3.1: A Developer's Guide," M & T Publishing Inc., 1992, pp. 541–577.

*Primary Examiner*—Raymond J. Bayerl
*Assistant Examiner*—Crescelle N. dela Torre
*Attorney, Agent, or Firm*—Blakely Sokoloff Taylor & Zafman, LLP

[57] ABSTRACT

A method of communicating information in a computer system. First generate a send set. The send set includes a first type indicator. The first type indicator corresponds to a send object. Next, define a drag site as being associated with the send set. Register the drag site with a first exchange manager. Generate a receive set. The receive set includes the first type indicator. Define a drop site as being associated with the receive set. Register the drop site with a second exchange manager. Drag from the drag site to the drop site. Drop on the drop site. In response to the drop on the drop site, the second exchange manager requests an object corresponding to the first type indicator. The first exchange manager communicates the information, the information corresponding to the send object.

7 Claims, 7 Drawing Sheets

METHOD AND APPARATUS FOR EXCHANGING INFORMATION BETWEEN APPLICATION PROGRAMS ACCORDING TO A DRAG AND DROP OPERATION

This is a continuation of application Ser. No. 08/331,028, filed Dec. 27, 1994, now abandoned.

NOTICE

©SynOptics Communications Inc., 1994. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

1. Field of the Invention

The present invention relates to the field of inter-application communication. In particular, the present invention describes a method and apparatus that can be used to communicate information between two applications as a result of a drag and drop operation.

2. Description of Related Art

Drag and drop operations are used in computer systems as a graphical user interface feature for exchanging information between one or more applications. An example of drag and drop operation is supported in the Macintosh® user interface, System 7.0, available from Apple Computer, Cupertino, Calif. A user can select, for example, an icon corresponding to a first file. This is the start of the drag operation. The user drags the file icon over to an icon corresponding to a folder. The user then drops the file icon on the folder icon. This represents the end of the drag and drop from the user's perspective. However, the drop causes the operating system to move the file icon to the dropped on folder.

Drag and drop can be relatively simple to implement within a single application. For example, the above described drag and drop is implemented within the system software only. Drag and drop becomes more difficult to implement when the operation is to be performed between two applications. Open Systems Foundation's OSF/Motif (Motif) and the X Window System (X Windows) support a basic mechanism for the communications of information between applications. However, this basic mechanism can be difficult for application programmers to use.

The following illustrates an example of Motif C code that an application programmer implements to define a Motif drag site and/or drop site. This example illustrates a number of shortcomings of Motif.

```
//define the information types that may be accepted by the drop site
Atom importList[0] = COMPOUND_TEXT;
//define required arguments by X
XtSetArg(args[0], XmNimportTargets, importList);
XtSetArg(args[1], XmNnumImportTargets, 1);
XtSetArg(args[2], XmNdropSiteOperations, XmDROP_COPY);
XtSetArg(args[3], XmNdropProc, vHandleDrop);
// now register the drop site graphical object with these arguments
XmDropSiteRegister(wLabelWidget, args, 4);
void vHandleDrop(Widget w, XtPointer pClient, XtPointer pCall)
{
        XmDropProcCallback              dropData;
        XmDropTransferEntryRec          transferEntries[2];
        XmDropTransferEntry             transferList;
        dropData = pCall;
        if ((dropData->dropAction != XmDROP)||
                (dropData->operation != XmDROP_COPY))
                XtSetArg(args[n],XmNtransferStatus,XmTRANSFER_FAILURE);
                n++;
        }
        else
        {
                transferEntries[0].target = COMPOUND_TEXT;
                transferEntries[1].client_data = (XtPointer)w;
                transferList = transferEntries;
                XtSetArgs(args[n], XmNdropTransfers, transferList); n++;
                XtSetArgs(args[n], XmNnumDropTransfers, 1); n++;
                XtSetArgs(args[n], XmNtransferProc, vTransferProc); n++;
        }
        XmDropTransferProc(dropData->dragContext, args, n);
}
void vTransferProc(Widget w, XtPointer closure, Atom *seltype,
                Atom *type, XtPointer value, u_long *length, int format)
{
}
        int n;
        Arg     args[MAX_ARGS];
        if (*type = COMPOUND_TEXT)
        {
                n = 0;
                XtSetArg(args[n], XmNlabelString,
                        XmCvtCTToXmString(value));
                n++;
                XtSetValues(closure, args, n);
        }
}
```

Motif Drag Site Use:

The programmer should know that the Motif drag and drop protocol uses the X Window translations and actions table for each graphical object that will be dragged. Consequently the programmer should understand how this works.

The programmer should know how Motif drag and drop sites recognize valid exchanges of information. This is done via the X Window atom registration in an X-server (described below). Again, the programmer should know how this works.

The programmer should understand that the programmer is responsible for starting a drag and hence is required to know the arguments and functions to be invoked within the start drag callback.

A conversion function (not shown above), called some time after the drag starts, has ten arguments that should be understood to take full advantage of the Motif drag and drop interface. The conversion function is used to process transfer requests from the receiver of the drop.

The programmer has to understand what is required of the conversion function with respect to correct argument return.

Motif Drop Site Use:

The programmer should understand the various parameters that are required by X Windows to enable a correct drop site registration in the X server.

The programmer should understand that the Motif drag and drop operation first calls vHandleDrop and then sometime later calls vTransferProc. The requirements of both functions should also be known.

The transfer of information procedure has a total of seven arguments. All seven arguments should be understood and used at various points of a complete application.

Generally, the programmer has had to understand the underlying mechanism for the Motif drag and drop operation. The Motif drag and drop protocol does not provide applications with the concept of an object oriented communication between applications. The programmer must translate any high-level objects in an application into a series of basic building blocks such as integers, characters . . . etc.

Therefore, what is needed is a simplified drag and drop protocol that provides a higher level of abstraction than presently provided by Motif, for example. The drag and drop protocol should support communications between multiple applications.

An improved method and apparatus for exchanging information between multiple applications.

SUMMARY OF THE INVENTION

An improved method and apparatus for exchanging information between multiple applications is described.

A method of communicating information in a computer system. First generate a send set. The send set includes a first type indicator. The first type indicator corresponds to a send object. Next, define a drag site as being associated with the send set. Register the drag site with a first exchange manager. Generate a receive set. The receive set includes the first type indicator. Define a drop site as being associated with the receive set. Register the drop site with a second exchange manager. Drag from the drag site to the drop site. Drop on the drop site. In response to the drop on the drop site, the second exchange manager requests an object corresponding to the first type indicator. The first exchange manager communicates the information, the information corresponding to the send object.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

An improved method and apparatus for exchanging information between multiple applications is described. In the following description, numerous specific details are set forth such as X Windows interfaces, Object Control Language list creation, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

In one embodiment of the present invention, an exchange manager is associated with each application. The exchange manager provides a high level interface for the application programmer. In one embodiment, a higher level of abstraction is provided to the application programmer though the use of object oriented techniques. For a drag site, the application programmer need only define the list(s) of objects that are to be sent from a drag site and then register this list with the corresponding exchange manager. Similarly, for a drop site, the programmer need only define the list(s) of objects that can be received by the drop site and then register this list with the corresponding exchange manager. The exchange managers control the lower layers of the system, thereby insulating the programmer from the complexity of these lower layers.

In one embodiment of the present invention, the drag site can be defined as being static or dynamic. Static drag sites communicate information that does not change during the existence of the drag site. Dynamic drag sites communicate information that is updated when a drag occurs. The ability to choose between a static drag site and a dynamic drag site provides further abstraction for the application programmer.

Computer System

Figure 1:
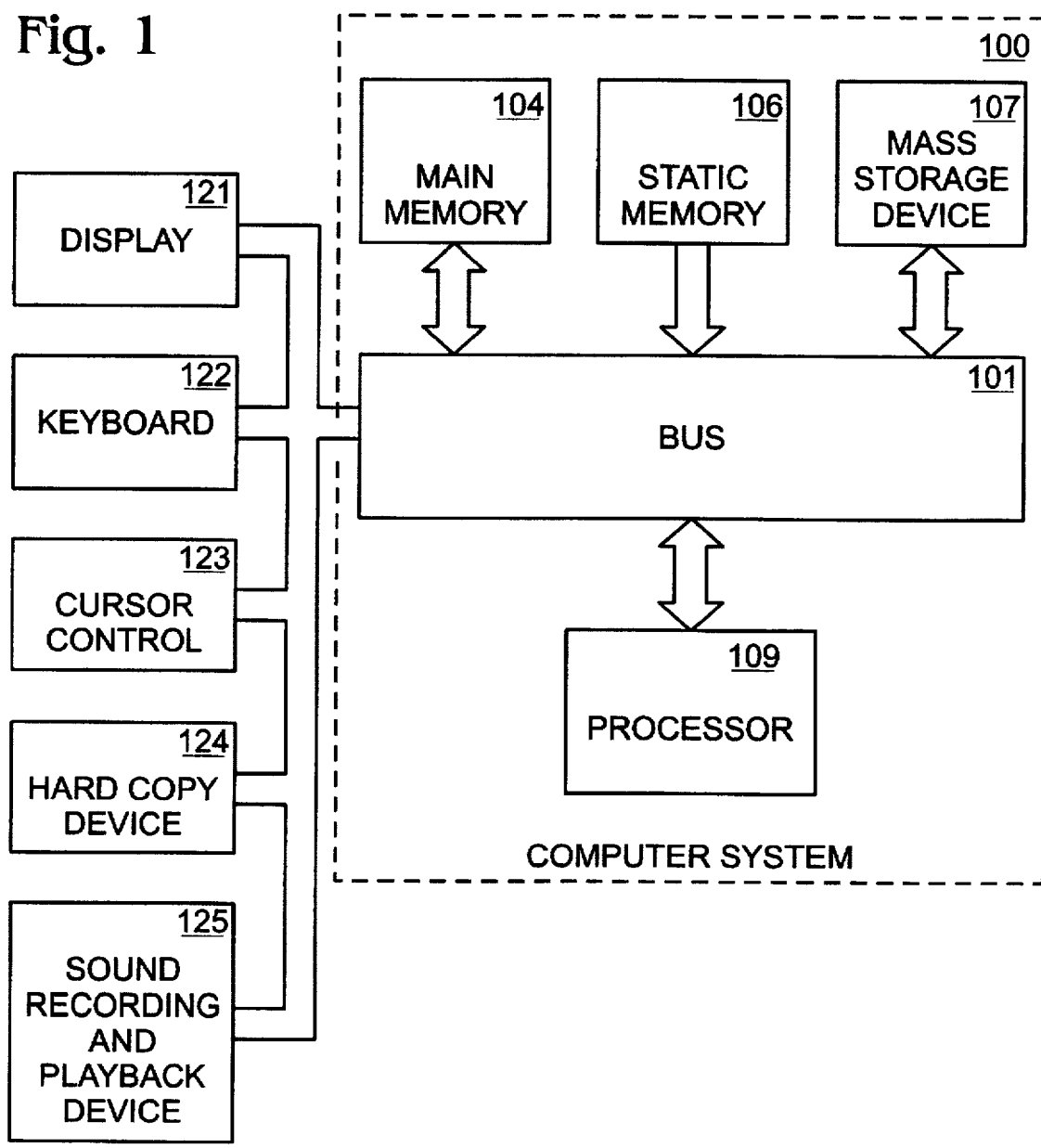
FIG. 1 illustrates a computer system upon which one embodiment of the present invention can be implemented.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom. The input device 122 can be used to by a user to perform a drag and drop on graphical information displayed on display device 121.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices.

Window System

One embodiment of the present invention uses the X Window System (X Window System is a trademark of The Massachusetts Institute of Technology) and the OSF/Motif widget set to facilitate the transfer of information between applications. Other embodiments use other systems for facilitating the communication of information. For example, Open View system, from Sun Microsystems, can be used. Numerous references exist for the X Window System, however, a general review of some concepts is presented herein.

The X Window System is a network transparent graphical windowing interface for computers. Multiple applications can execute simultaneously while connected to one display. Network transparent execution allows the applications to run on different computers on a network.

The X Window System is based on a client server model. A single process, known as an X server, is responsible for all input and output devices. The X server creates and manipulates windows on the screen, produces text and graphics, and handles input devices such as a keyboard and mouse. A client is an application that uses the X server's facilities. A client communicates with the X server by a local interapplication (interprocess) communications mechanism, or a network protocol, such as TCP/IP.

The following definitions will help in the understanding of the following disclosure:

Display: a single X server process. Display can be used interchangeably with "X server." This definition differs from the computer monitor "display".

Screen: a single hardware output device. A single display can support many screens.

Widget: a user interface component used by programmers to create a user interface. Examples of widgets are scroll bars, title bars, menus, and dialog boxes. A widget includes a user interface window and some procedures that operate on the window. Each widget includes a widget ID to identify that widget.

Window: a defined area on the display. Each window has a window ID. A window is associated with a widget.

Callback: the act that causes some code in an application to execute. Typically, the Xt Intrinsics (see below) calls an application's function (the callback function) when some user activity has occurred in a window corresponding to a particular widget. The application had previously registered the callback function with the Xt Intrinsics 240 (described below).

Callback function: code in an application that defines a function. The X server calls the function when an event is detected by the X server.

Figure 2:
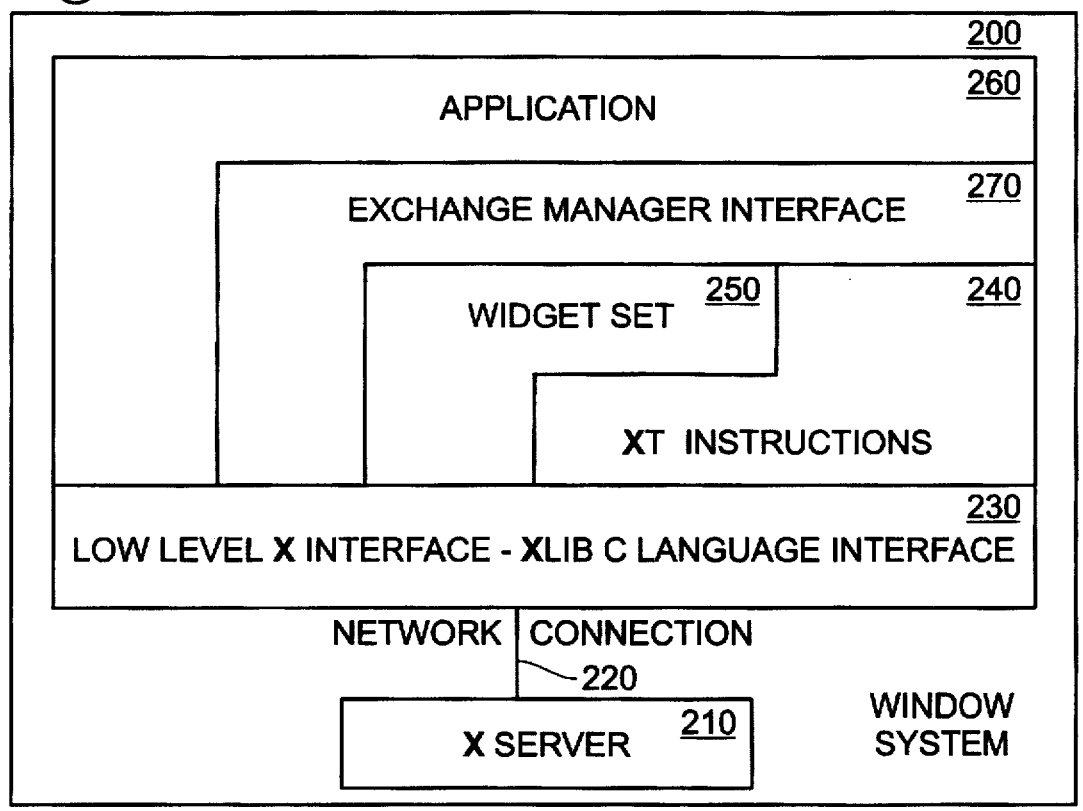
FIG. 2 illustrates a programmer's view of a window system including one embodiment of the present invention.

FIG. 2 illustrates a programmer's view of a window system 200 including a exchange manager interface 270. Note, also included is a widget set 250, discussed below. Application 260 represents the application written by the programmer. This application can be executing on a computer system such as described in FIG. 1. Application 260 has access to various aspects of the user interface system including: the exchange manager interface 270, the widget set 250; the Xt Intrinsics 240, and the low level X interface 230.

Each application is written to use these elements to connect to an X server 210, over a network connection 220. The widget set 250, in one embodiment of the present invention, is the Open Systems Foundation (OSF)'s Motif widget set. However, almost any widget set can be used. Widget set 250 implements user interface components, including scroll bars, etc. and supports basic interapplication communications protocol. Xt Intrinsics 240 provides a framework for combining the widgets to create a complete user interface. The low level X interface 230 provides the application with access to the most fundamental procedures and data structures of the X Window System. In one embodiment, the low level X interface 230, the Xt Intrinsics 240, and the widget set 250 are written in C, while the exchange manager interface 270 is written in C++.

By connecting to the X server 210, each application can have the X server 210 process events for that application. Thus, when a user interacts with the user interface portion of the display relating to application 260, the X server 210 notifies the low level X interface 230 and Xt Intrinsics 240. Xt Intrinsics 240 in turn notifies application 260 through a callback. The X server 210 sends the event, associated with the user interaction, to Xt Intrinsics 240. The event is sent with a window ID for identifying the window in which the event occurred. Xt Intrinsics 240 uses the low level X interface 230 to read the event. Xt Intrinsics 240 determines which widget corresponds with the window ID. Then, Xt Intrinsics 240 notifies the corresponding widget in the widget set 250. Xt Intrinsics 240 then causes a callback function, corresponding to the widget and the type of event sent from the X server 210, to execute. The callback function, in some cases, will cause the execution of functions and/or procedures in the exchange manager interface 270. The callback function can cause the modification of the display through a series of X commands (e.g. display new information in a window, displaying a pop-up menu).

The exchange manager interface 270 allows for the instantiation of an exchange manager for each application. The exchange manager is a collection of procedures and data structures for interfacing between the application 260 and the lower layers of the window system 200. The exchange manager interface 270 simplifies the OSF/Motif drag and drop protocol in that the application 260 programmer need know much less about how the underlying mechanisms work. Further, the exchange manager interface 270 provides an object oriented interface that communicates to the application 260 using objects. This differs from OSF/Motif in that OSF/Motif supports only the communications of blocks of memory. The sender and the receiver must interpret what the block of memory represents. Further, the exchange manager interface 270 supports the use of OCL, Object Control Language. This allows the application programmers to be free from predetermining the content of an object and the order of the information in the object For further information on OCL, see patent application Ser. No. 08/235,158, filed on Apr. 28, 1994, and assigned to the assignee of the present invention. Note that other object oriented languages could be used such as SmallTalk or Lisp.

In another embodiment of the present invention, a non-object oriented exchange manager is used. For this embodiment, a level of abstraction is still provided to the user using other data structures. In any case, what is important is the existence of some type of exchange manager.

For further background on the X Window System, see Scheifler, R. W. *X Window System*, (third edition) USA, Digital Press, 1992; Young, D. A. *The X Window System: Programming and Applications with Xt*. Englewood, N.J., Prentice-Hall, 1990.; and, Asente, P. J. *X Window System Toolkit: The Complete Programmer's Guide and Specification*, Digital Press, 1990.

Example Drag and Drop

Figure 3:
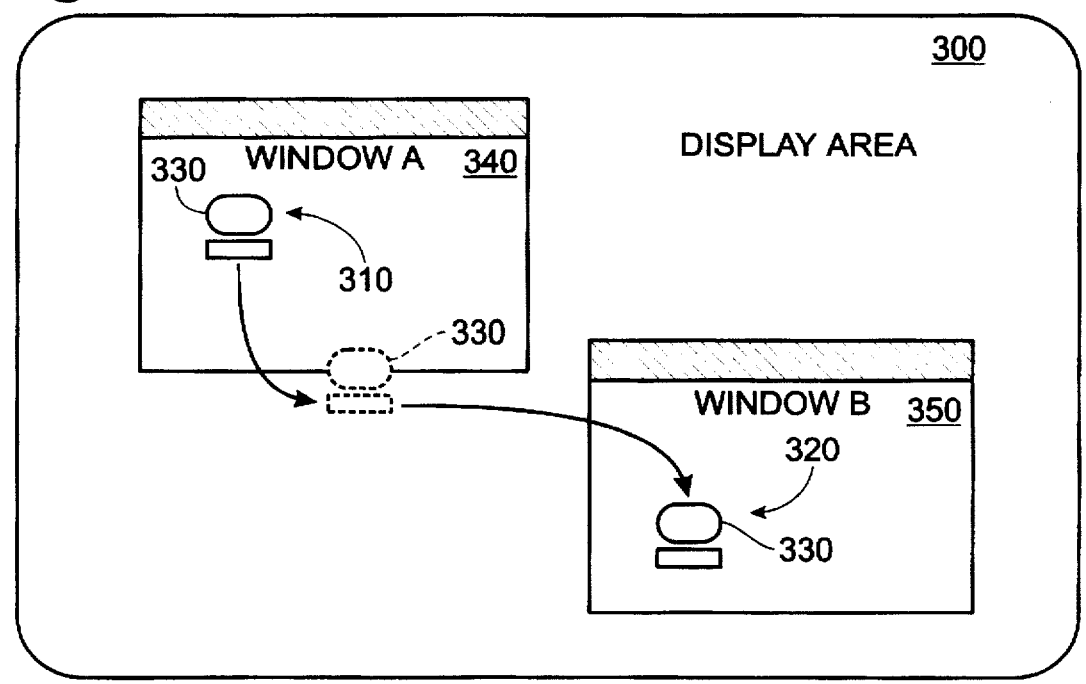
FIG. 3 illustrates an example of a drag and drop.

FIG. 3 illustrates a drag and drop operation as seen from the user's perspective. Display area 300 represents the display viewable by a user.

Window A 340 is a window generated by the X Window System. For this example, assume that window A 340 corresponds to an application A. That is, the application A causes the X server 210 to display the window A 340. Window A 340 includes a graphical representation of a drag site 310. In this example, the drag site corresponds to an icon of a terminal.

Window B 350 is a window generated by the X Window System. Assume that window B 350 corresponds to an application B. Window B 350 includes a graphical representation of a drop site 320. In this example, the drop site corresponds to the white portion of the window B 350.

FIG. 3 includes a graphical representation of an object being dragged and dropped 330. This corresponds to a user selecting on the graphical representation of the drag site 310 (the icon in this example), dragging (moving) the icon to the drop site 320, and then dropping the icon on the drop site 320.

From the user's perspective, the operation moves the information corresponding to the drag site 310 to the drop site 320. However, from the application A programmer's perspective, she will have to ensure that the information corresponding to drag site 310 can be transmitted to applications capable of receiving the information. From the application B programmer's perspective, he will have to ensure that particular types of information can be received as a result of a drop onto drop site 320.

In one embodiment of the present invention, the application programmers need know relatively little about the mechanisms used to communicate the information between the drag site 310 and the drop site 320. In this embodiment, each application is associated with an exchange manager.

Drag and Drop Generally

Figure 4:
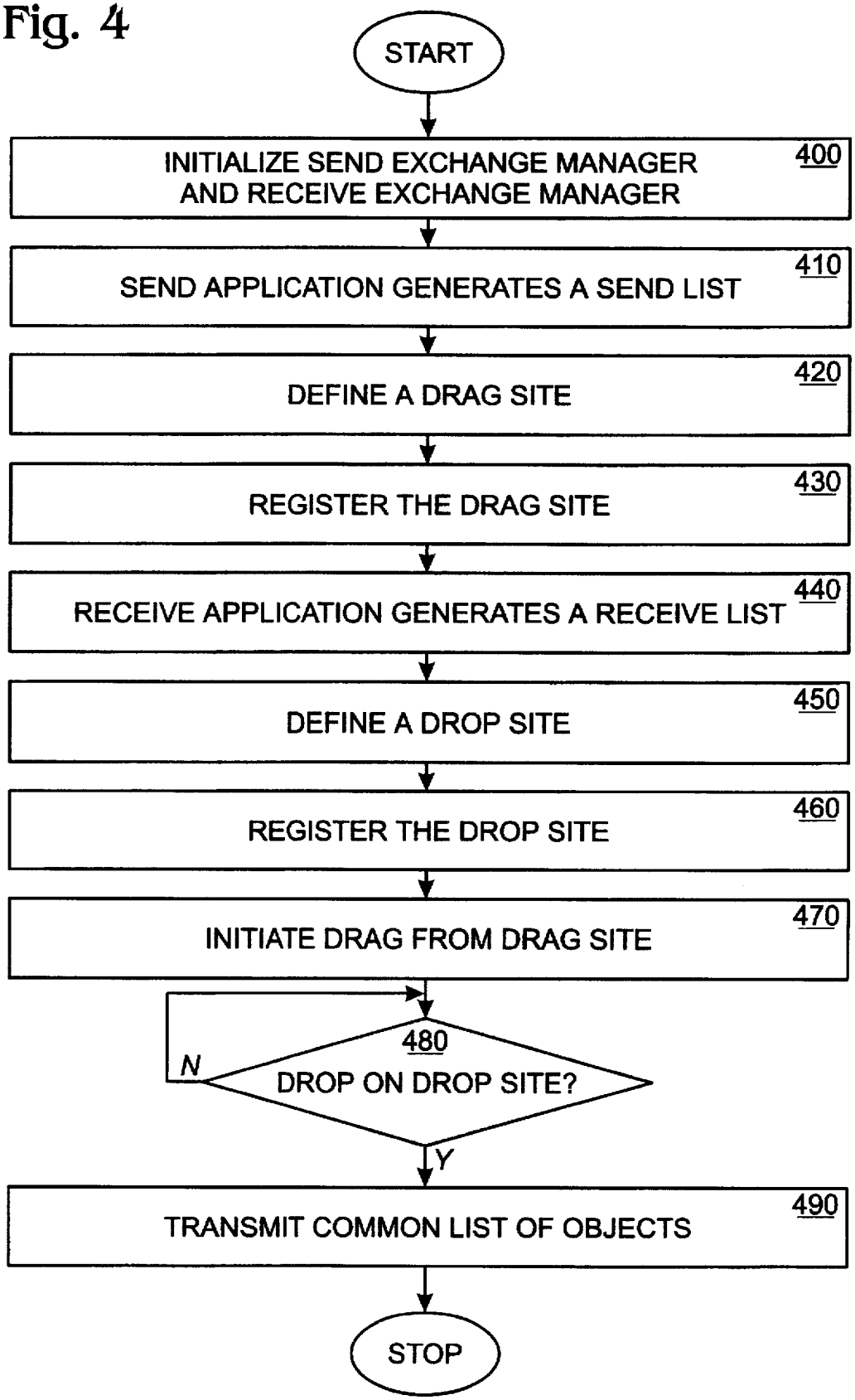
FIG. 4 is a flowchart of one embodiment of a method for dragging and dropping.

FIG. 4 illustrates one embodiment of a method for dragging and dropping between two applications. This method can be implemented using the computer system 100 and the window system 200. Assume for the purposes of this example that the application A and application B of FIG. 3 are referred to as the send application and the receive application respectively. Note that an application can have both drag sites and drop sites and can therefore be both a sender and receiver.

At step 400, an exchange manager is initialized for the send application and an exchange manager is initialized for the receive application. Typically, this done at the start of the execution of each application which will be supporting exchange manager drag and drop. Initialization can include the creation of an instance of an exchange manager object. In one embodiment, the top level widget of the application is used to instantiate the exchange manager. This allows the exchange manager to access the widget set 250 and the other lower levels of the window system 200. Note that the use of the names "send" and "receive" are for convenience in distinguishing between the two exchange managers associated with the two applications. The two exchange managers are not generally different. The following illustrates one example of the code for creating an exchange manager:

```
cXchangeMgr   *pXchangeManager;
Widget        wParent;    /* boundary of the application   */
pXchangeManager = new cXchangeMgr(wParent);
```

At step 410, the send application generates a send list. A list is a data structure that includes zero or more data objects. Where a list is referred to, a set could be used instead. An object is a data structure that includes data and/or behaviors. In one embodiment, the send list is a list of objects that the send application is willing to transmit. In one embodiment, the send list includes a type identifying object and objects corresponding to attributes of that type of object. Multiple send lists can be generated for a single drag site. The creation of the drag site is discussed in more detail below. In another embodiment, the send list includes the object types that the sender is willing to send (or export).

At step 420, the send application defines a drag site. The drag site is defined using any widget within the send application. The drag site can either be a static drag site or a dynamic drag site. A static drag site holds the name (corresponding to the object type) and value of the information that can be sent. Because the static drag site holds both the name and value, after the drag site is recreated, and registered, then the drag site need not refer back to the application for this information. A dynamic drag site holds only the name of the information that will be transmitted. The dynamic drag site passes a pointer to a function that is invoked as a result of the drag. The function provides up to date values corresponding to the named information. In one embodiment of the present invention, the drag site is defined using the send list(s). The drag site maintains the send list(s). The following illustrates the creation and definition of a static drag site:

```
XpmAttributes attrs;
int         iRes;
Pixmap      pixmap;
Pixmap      pixmapMask;
iRes = pXchangeMgr->iReadDragIconFile ("xbmfile",
            &attrs, &pixmap, &pixmapMask);
if (iRes != BitmapSuccess)
    return;
// create drag site that is going to static
cDragSiteRec *pDragsite = new cDragSiteRec(w,
            1,
            pLists,
            XCH_CLIENT_DATA,
            (XtPointer) this,
            XCH_DESKTOP,
            vHandleDeskDropCB,
            XCH_DRAG_ICONS, pDragIcons,
            NULL);
```

At step 430, the drag site is registered with the exchange manager. Registration includes having the exchange manager maintain the send lists. Typically, this is done by having the exchange manager include a database of lists for the drag and drop sites of its corresponding application. Registration causes the exchange manager to initialize itself with the X server 210. This includes registering the protocol style, registering the event handler for the drag when the site is registered, and providing pointers to callback functions that the lower layers of the window system should call if a drag is initiated, if a drop is successful, etc.

At step 440, the receive application generates a receive list. The receive list is generated in the same manner as a send list. The receive list represents the types of objects which a drop site will accept. In one embodiment, the receive list includes objects that identify these types of objects. Each object includes a previously agreed upon name for that type of object. In one embodiment, the exchange manager generates an X atom identifier (described below) for each type of object to be exchanged. In one embodiment, this is done using the name of the type of the object.

By using OCL, or some other object oriented language, the receive list need not match the send list exactly. For example, assume that the receive list defines a port object type. A port object for the receiver requires a manager address, a slot number and a port number. Further assume that the send list includes a port object type. The port object type for the sender requires a manager address, a slot number, a port number, and a status indicator (e.g. connected or not). The receive exchange manager will request the port object, but will ignore the status indicator because it is not needed. For more details on these types of capabilities of OCL, see the patent application Ser. No. 08/235,158, filed on Apr. 28, 1994, assigned to the assignee of the present invention.

At step 450, the receive application defines a drop site. The drop site can use any widget in the receive application's set of widgets. If a drop site widget is a parent of other widgets, all child widgets are part of the drop site as well.

At step 460, the receive application registers the drop site with the receive exchange manager. This includes providing the receive exchange manager with the receive list and a pointer to a function that can be called in the receive application when a drop has occurred. The receive exchange manager then typically maintains the receive list in a database.

At step 470, the user initiates the drag. This is typically done by selecting within the area defined by the drag site. In one embodiment of the present invention, the area is the area defined by the widget associated with the drag site. The exchange manager, associated with the drag site, is notified as described in relation to FIG. 2 and FIG. 3. In one embodiment of the present invention, the exchange manager provides the X server 210 with a different bitmap to display when the drag is started. The X server 210 can display this new bitmap so that the user is notified that the drag operation has started.

At step 480, a test is performed to determine whether the drop has occurred. If no drop occurs, then the test is repeated. If the drag is aborted, then the exchange manager is notified that the drag operation has been aborted. If a valid drop occurs, then, at step 490, the send list of objects is transmitted from the send exchange manager to the receive exchange manager. This is discussed in more detail below.

Generation of a Drag Site

Figure 5:
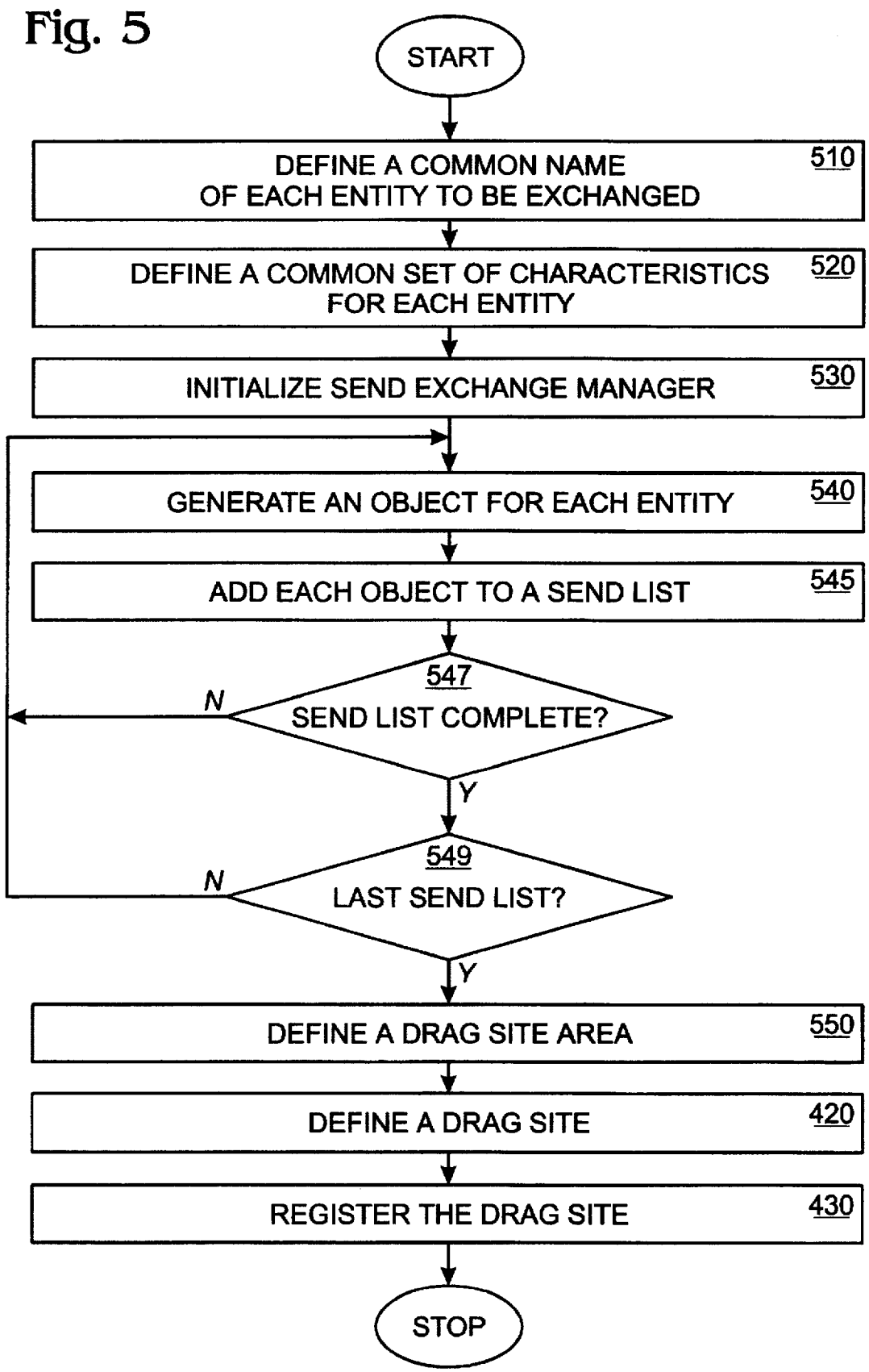
FIG. 5 is a flowchart of one embodiment of a method of generating a drag site.

FIG. 5 is a flowchart of one embodiment of a method of generating a drag site.

Step 510 and step 520 require the application programmers, of the various applications, to agree upon how information will be identified among the various applications. For example, application programmers may define port objects to have a particular unique name, and include a minimum amount of other objects.

At step 510, a common name need be defined for each entity to be exchanged. For example, an Ethernet port object may be referenced as "EnetPort", or a router object may be referenced as "router." This defines the type of data that will be exchanged.

At step 520, a minimum set of characteristics to be exchanged is defined for each entity to be exchanged. For example, an Ethernet port object may include a manager address, a slot number and a port number. The router may include an IP address. Step 510 and 520 can be combined into one step where the name of the entity can be used. What is important is that some unique identifier is established for each object to be exchanged (the information for the entity to be communicated).

At step 530, the send exchange manager is initialized. This is typically done before any of the drag sites are created.

After the information to be exchanged has been identified, the code to generate the send list(s) can be included in the application. When executed, this code will cause the corresponding objects and lists to be created. At step 540, an object for each entity is created. In one embodiment, object for entity includes objects describing the type of entity and objects representing the characteristics of the entity. At step 545, the newly created object is added to the send list. At step 547, a test is made to determine whether the send list is complete. If the list is not complete, step 545 and step 547 are repeated. If the send list is complete, at step 549, a test is made to determine if another send list is to be created. Multiple send lists can be created where one drag site can transmit information for more that than one type of entity. If multiple send lists are to be created, then step 540 through step 549 are repeated.

The results of an execution of step 540 through step 545, for the Ethernet port is the following list. Each object in the list is represented as a property (or name) and value pair.

```
- "EnetPort" OCL list will be
    ( ("XCH_ATOM_IDENTIFIER", "XCH_EnetPort"),
      ("MgrAddress", 134.22.22.22),
      ("SlotNum", 2),
      ("PortNum", 3)
    )
For the router example, the following list is generated:
- "router" OCL list will be
    ( ("XCH_ATOM_IDENTIFIER", "XCH_router"),
      ("IpAddress", 123.345.568.777)
    )
```

At step 550, the drag site area is defined. In one embodiment, this is performed by creating a widget for an application. The widget defines a window on the display. The window is where the user will select when the user wishes to initiate a drag operation.

Next, step 420 and then step 430 are performed as described above. The send exchange manager uses the send list to create X atom identifiers for each type of entity to be exchanged. In one embodiment, this name of the type of object is used by the exchange manager as an X atom identifier. The exchange manager registers the X atom identifier with the X server 210. The X server 210 uses the X atom identifiers to make an initial determination of whether a drop site is valid. For example, an Ethernet port object type may have an X atom identifier "XCH_EnetPort". A router object type may have an X atom identifier of "XCH_router".

Table 1 illustrates the code for one example of the creation and registration of a static drag site for a port icon (step 510 and step 520 are omitted). The port icon represents a port on a network hub, for example. When a drag and drop operation is performed on the port icon, a list of port attributes, or characteristics, will be transmitted.

TABLE 1

```
Widget portIcon;
// construct the pExportValueList with name and value
// pairs of port attributes.
pExportValue = ....
// construct the drag site class object
cDragSiteRec *pDragSite =
    new cDragSiteRec ( portIcon,
                       1,
                       pExportValueList,
                       XCH_CLIENT_DATA,
                       (Xtpointer) this,
                       NULL);
eRes = pXchangeMgr->eDragSiteRegisterStatic(*pDragSite);
if (eRes != XCH_OK)
    // failed to register drag site widget
```

Table 2 illustrates the code for one example of the creation and registration of a dynamic drag site (step 510 and step 520 are omitted).

TABLE 2

```
class OCLLIST;
class cExampleClass {
private :
    static OCLLIST *pHandleXchangeCB
                   (Widget w, XtPointer pClientData,
                    OCLSYMBOL *pSymbol);
public :
    OCLLIST *pHandleXchange
                   (Widget w, OCLSYMBOL *pSymbol);
};
OCLLIST* cExampleClass : : pHandleXchangeCB
                   (Widget w, XtPointer pClientData,
                    OCLSYMBOL *pSymbol)
{
    cExampleClass pEx = (cExampleClass*)pClientData;
    return (pEx->vHandleXchange(w, pSymbol));
}
OCLLIST* cExampleClass : : vHandleXchange(Widget w,
                                          OCLSYMBOL *pSymbol)
{
    // construct an OCLLIST containing the
    // exported information for the OCLSYMBOL being
    // asked for. The OCLSYMBOL names the information being
    // asked for.
    // if there are several OCLSYMBOLs being exchange this
    // function is called for each OCLSYMBOL.
}
Widget      portIcon;
cExampleClass *pEx;
// construct the pExportValueList with only names
pExportValueList = . . .
// construct the drag site object
cDragSiteRec *pDragSite =
    new cDragSiteRec (portIcon,
                      1,
                      pExportValueList,
                      XCH_CONV_SEND,
                      &cExampleClass: :pHandleXchangeCB,
                      XCH_CLIENT_DATA,
                      (Xtpointer)this,
                      NULL);
eRes = pXchangeMgr->eDragSiteRegisterDynamic(*pDragSite);
if (eRes != XCH_OK)
    // failed to register drag site widget
```

Generation of a Drop Site

Figure 6:
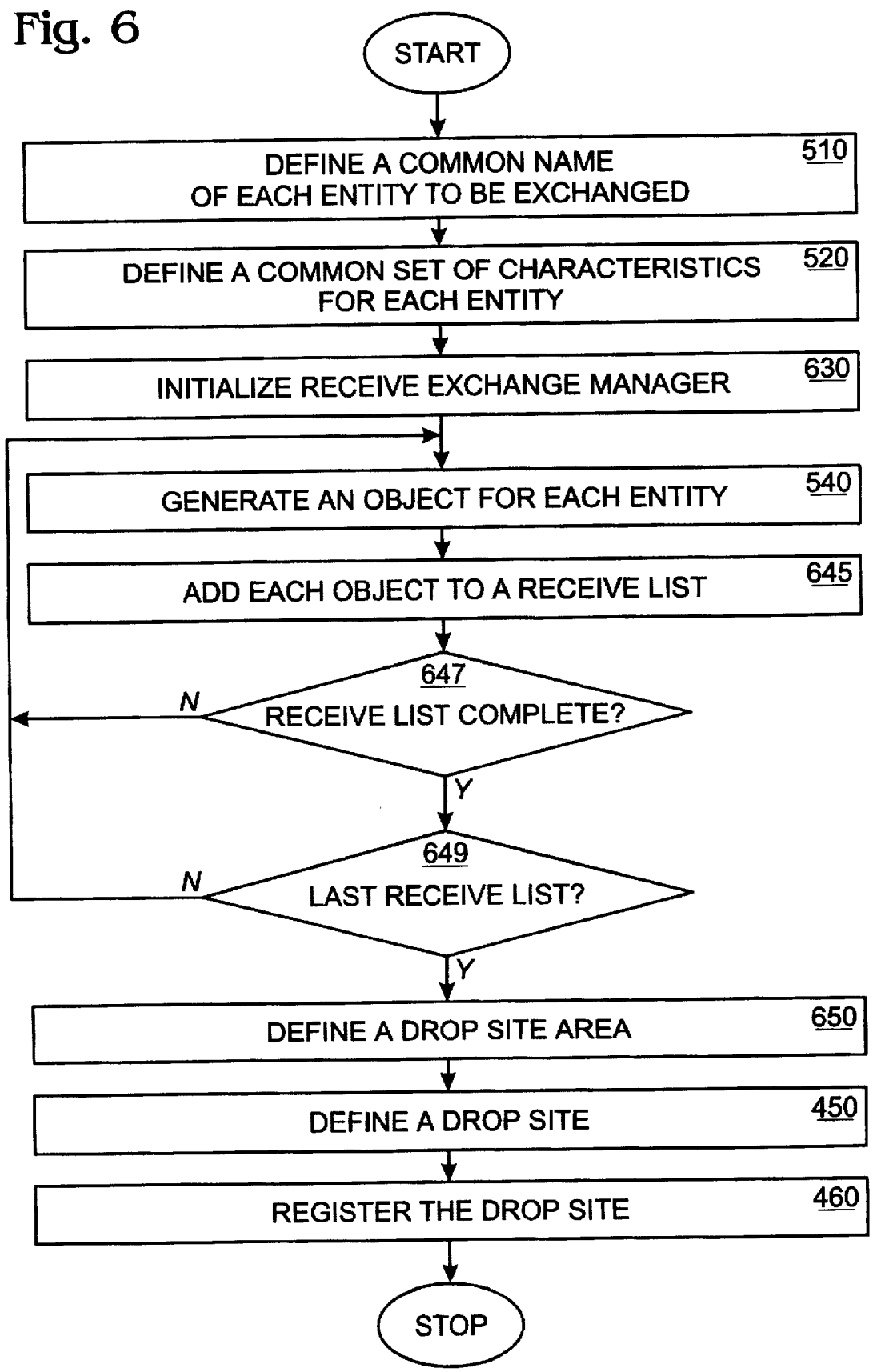
FIG. 6 is a flowchart of one embodiment of a method of generating a drop site.

FIG. 6 is a flowchart of one embodiment of a method of generating a drop site. This flowchart is similar to the flowchart of FIG. 5.

First step 510 and step 520 are performed. Next, at step 630 the receive exchange manager is initialized. This is typically done before any drop sites are created.

When executed, step 540, step 645, step 647 and step 649 will generate the receive list(s) much like the generation of the send list(s) in step 540, step 545, step 547 and step 549. The difference is that the receive list is being created. The receive list merely defines the types of data to be imported, therefore, unlike the send list, no values need be stored in the receive list.

Next, at step 650, the drop site area is created. This is done in a manner similar to the creation of the drag site area. The following is an example of code used to create a drag site:

```
pAnimation = new cAnimation (XmDRAG_UNDER_SHADOW_OUT);
XRectangle Rects[] = {
    { 10, 0, 10, 10 }
}
cDropSiteRec *pDropSite = new cDropSiteRec(w,
                                            1,
                                            pLists,
```

-continued

```
                      XCH_CLIENT_DATA,
(XtPointer)this,
                      XCH_HELP_PROC,
                      vHandleHelpCB,
                      XCH_ANIMATION, pAnimation,
                      XCH_NUM_RECTS, 1,
                      XCH_RECTS, &Rects,
                      NULL);
```

Next step 450 and step 460 are performed as described above.

Table 3 illustrates an example of the creation and registration of a drop site. This example enables a drop onto a port icon.

TABLE 3

```
class cExampleClass {
  private :
    static void vHandleDropCB
                      (Widget w,
                       XtPointer pClientData,
                       OCLLIST *pList);
  public :
    void vHandleDrop (OCLLIST *pList);
};
void cExampleClass : : vHandleDropCB
                      (Widget w,
                       XtPointer pClientData,
                       OCLLIST *pList);
{
  cExampleClass pEx = (cExampleClass*)pClientData;
  pEx->vHandleDrop (pList);
}
void cExampleClass : : vHandleDrop (OCLLIST *pList)
{
  // do something because we dropped the OCLLIST pList
  // on widget w.
}
// And then set the desktop function argument for
// the appropriate registration function.
Widget        portIcon;
cExampleClass *pEx;
// construct the pImportValueList with names and values
pImportValueList = ...
// construct the drag site object
cDropSiteRec *pDropSite = new cDropSiteRec
                      (portIcon,
                       &cExampleClass:vHandleDropCB,
                       1, pImportValueList,
                       XCH_CLIENT_DATA,
                       (XtPointer)this,
                       NULL);
eRes = pXchangeMgr->eDropSiteRegister(pDropSite);
```

Detailed Description of a Drag and Drop

Figure 7A:
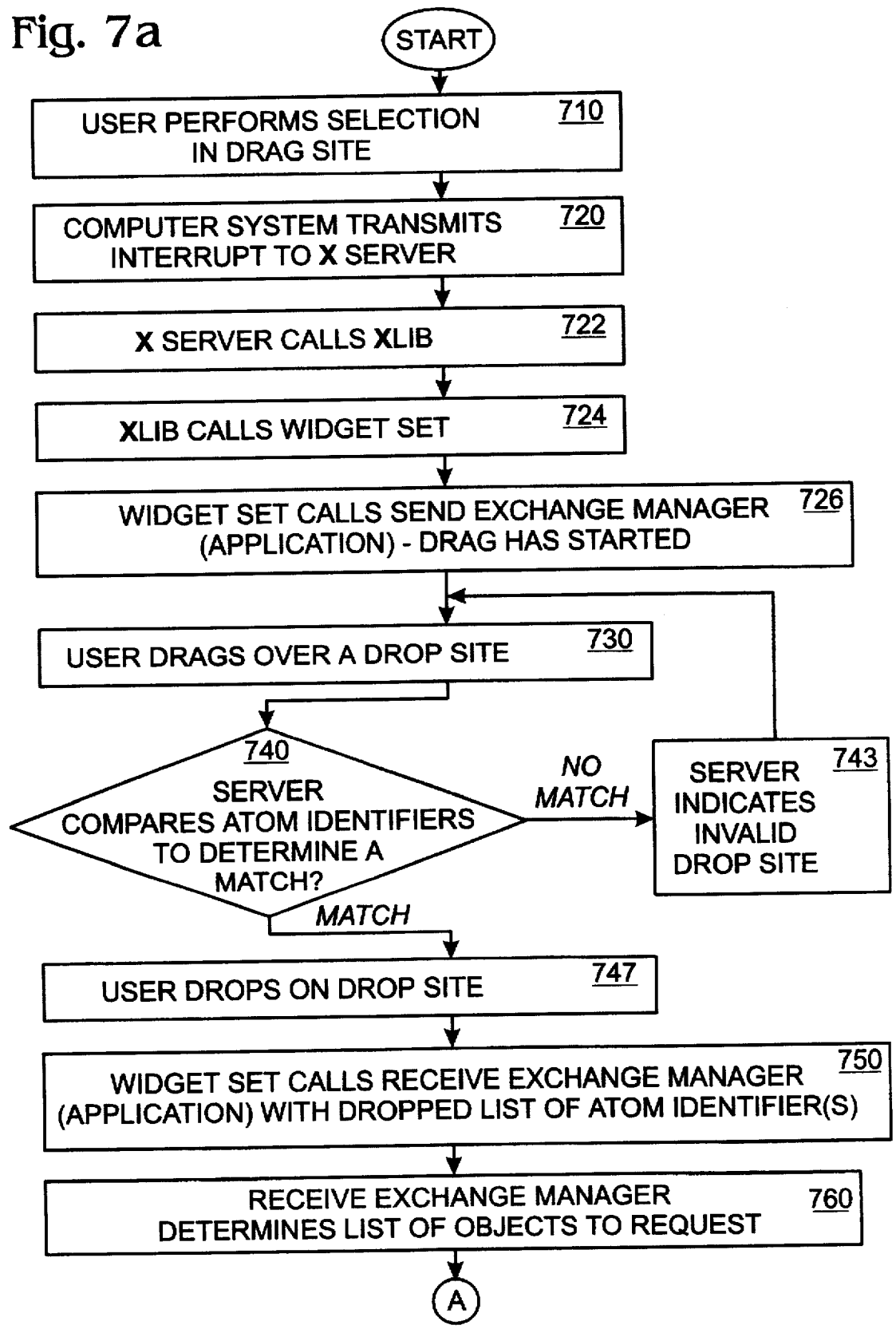
FIGS. 7a and 7b are a more detailed flowchart of one embodiment of a method of dragging and dropping.
Figure 7B:
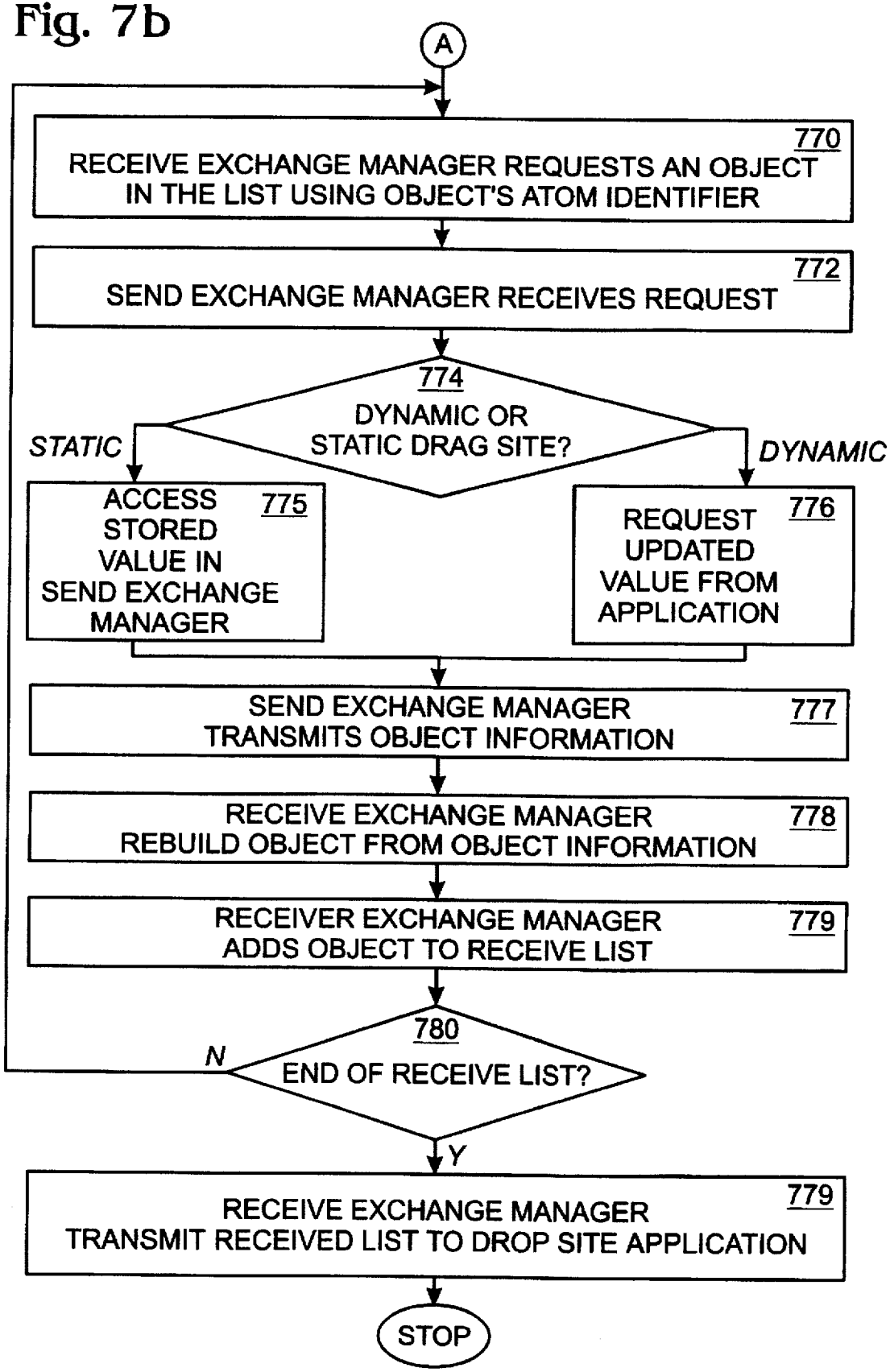

FIGS. 7a and 7b are a more detailed flowchart of one embodiment of a method of dragging and dropping.

At step 710, the user performs the selection within the area associated with the drag site.

At step 720, the computer system 100 communicates an interrupt to the X server 210. The X server 210 can be executing on the computer the user is using, or on another computer networked with the user's computer. At step 722, the X server 210 makes a call to the low level X interface 230. At step 724, the low level X interface 230 calls the widget set 250. At step 726, the widget set 250 calls the send exchange manager. To the widget set 250, this call appears to be a call to the application. However, because the X server registration functions are performed by the send exchange manager, the send exchange manager receives the call. Note that step 720 through step 726 is how the send exchange manager is notified that a drag operation has begun.

At step 730, the user drags within the area associated with a drop site.

At step 740, the X server 210 determines whether the drop site is a valid drop site. At one level of the window system, this is performed by comparing the X atom identifiers registered with the X server 210. If the site is not a valid drop site, then at step 743, the X server 210 indicates that the present location is an invalid drop site and step 730 and step 740 are repeated.

If the drop site is valid, the user can drop on that site, step 747.

At step 750, the widget set 250 calls the receive exchange manager with the dropped list of atom identifier(s). In one embodiment, the X server 210 initiates the call to the receive exchange manager. Typically, the dropped list of atom identifier(s) identifies the types of objects of the entity(ies) that are to be exchanged.

At step 760, the receive exchange manager determines the list of objects that should be requested from the send exchange manager. The determination is done by accessing the receive exchange manager's database of registered receive lists for a particular drop site.

Step 770 through step 780 are repeated for each object in the receive list. At step 770, the receive exchange manager, through the X server 210, requests an object in the receive list using that object's X atom identifier (see step 510 and step 520). In another embodiment, the common name created in step 510 is used.

At step 772, the send exchange manager receives the request through the X server 210 and determines which object is to be sent using the X atom identifier, or common name.

At step 774, the send exchange manager determines whether the drag site is static or dynamic. If the drag site is dynamic, then at step 775, the send exchange manager accesses the send list corresponding to the object's atom identifier. The send list includes the names and values for the attribute of the object. If the drag site is static, then at step 776, the send exchange manager requests the application associated with the drag site to provide the values for the object corresponding to the receive atom identifier.

At step 777, the send exchange manager transmits the information corresponding to the object being requested (the object information). In one embodiment, this is done by the send exchange manager breaking the object into its basic components that can be communicated by the X server 210 (e.g. characters, integers, etc.). In previous systems, the application programmer would have to provide the code to break the object into these basic components and transmit the object.

At step 778, the receive exchange manager rebuilds the requested object from the received object information. In previous systems, the application programmer would have to reconstruct the received object from the basic components received through the X server 210.

Once the object is rebuilt, at step 779, the received object is added to the received objects list.

At step 780, the receive exchange manager determines whether the receive list is complete. If more than one object is requested as the result of the drag and drop operation, the receive exchange manager repeats step 770 through step 780.

At step 790, the receive exchange manager provides the completed list to the application associated with the drop site. Thus, information from one application associated with a drag site is communicated to a second application associated with a drop site.

An improved method and apparatus for exchanging information between multiple applications has been described.

What is claimed is:

1. A computer implemented method for communicating information between a first application program and a second application program utilizing a drag and drop operation between windows, comprising the steps of:
   a) generating at the first application program a list of objects that the first application may send;
   b) defining at the first application program a drag site for maintaining the first list of objects;
   c) registering by the first application program the drag site with a first exchange manager associated with the first application program;
   d) generating at the second application program a second list of objects that indicate the types of objects that may be received;
   e) defining at the second application program a drop site for maintaining the second list of objects;
   f) registering by the second application program the drop site with a second exchange manager associated with the second application program;
   g) selecting a graphical representation of the drag site in the first window according to user input;
   h) dragging the graphical representation of the drag site from a first window associated with the first application program to a graphical representation of the drop site in a second window associated with the second application program according to user input;
   i) dropping the graphical representation of the drag site on the graphical representation of the drop site according to user input;
   j) requesting at the second exchange manager an object from the first list of objects having a type indicated by the second list of objects in response to the step of dropping the graphical representation of the drag site on the graphical representation of the drop site according to user input;
   k) transmitting the object from the first exchange manager to the second exchange manager; and
   l) transmitting the object from the second exchange manager to the second application program.

2. The method of claim 1, wherein the step of registering the drag site with a first exchange manager includes the step of maintaining the first list of objects in a first database accessible by the first exchange manager.

3. The method of claim 1, wherein the step of registering the drop site with a second exchange manager includes the step of maintaining the second list of objects in a second database accessible by the second exchange manager.

4. The method of claim 1, wherein the step of registering by the second application program the drop site with a second exchange manager associated with the second application program further includes the step of providing the second exchange manager with the second list of objects and a pointer to the second application program in a drop operation.

5. A computer implemented method for communicating object oriented information between a sending application program and a receiving application program utilizing a drag and drop operation in a windows programming environment, comprising the steps of:
   a) creating at the sending application program a send list of objects that the sending application program can send;
   b) creating a first window associated with the sending application program;
   c) creating at the sending application program a drag site for maintaining the send list of objects;
   d) maintaining the drag site at a send exchange manager associated with the sending application program;
   e) creating at the receiving application program a receive list of objects that can be received;
   f) creating a second window associated with the receiving application program;
   g) creating at the receiving application program a drop site for maintaining the receive list of objects;
   h) maintaining the drop site at a receive exchange manager associated with the receiving application program;
   i) dragging a graphical representation of the drag site from the first window to a graphical representation of the drop site in the second window;
   j) dropping the graphical representation of the drag site on the graphical representation of the drop site;
   k) requesting at the receive exchange manager a list of objects in common with the send list of objects and the receive list of objects; and
   l) transmitting the list of objects from the send exchange manager to the receive exchange manager.

6. In a client server computing environment having a server for creating and manipulating windows, a method for communicating information between application programs as a result of a drag and drop operation between windows associated with the application programs, comprising the steps of:
   a) selecting based on user input a drag site in a first window associated with a first application program;
   b) dragging based on user input the drag site in the first window to a drop site in a second window associated with a second application program;
   c) sending from a send exchange manager associated with the first application program a send list of objects associated with the drag site to a receive exchange manager associated with the second application program;
   d) comparing at the receive exchange manager the send list of objects with a receive list of objects associated with the drop site;
   e) sending from the receive exchange manager to the send exchange manager a request for a list of objects in common with the send list of objects and the receive list of objects;
   f) sending from the send exchange manager to the receive exchange manager the list of objects in response to the request for a list of objects in common with the send list of objects and the receive list of objects;
   g) sending from the send exchange manager via the server to the receive exchange manager data corresponding to the list of objects; and
   h) rebuilding the list of objects from and corresponding to the data at the receive exchange manager; and
   i) sending from the receive exchange manager to the second application program the list of objects.

7. The method of claim 6, wherein the step of sending from the send exchange manager to the receive exchange manager the list of objects in response to the request for a list of objects in common with the send list of objects and the receive list of objects is preceded by the steps of:
   if the list of objects is static, retrieving the list of objects from the send list of objects maintained by the send exchange manager; and
   if the list of objects is dynamic, retrieving the list of objects from the first application program.

* * * * *